June 13, 1939. L. J. BORDO 2,161,849
WATER LEVEL SIGHT GAUGE FOR BOILERS
Filed Oct. 27, 1937
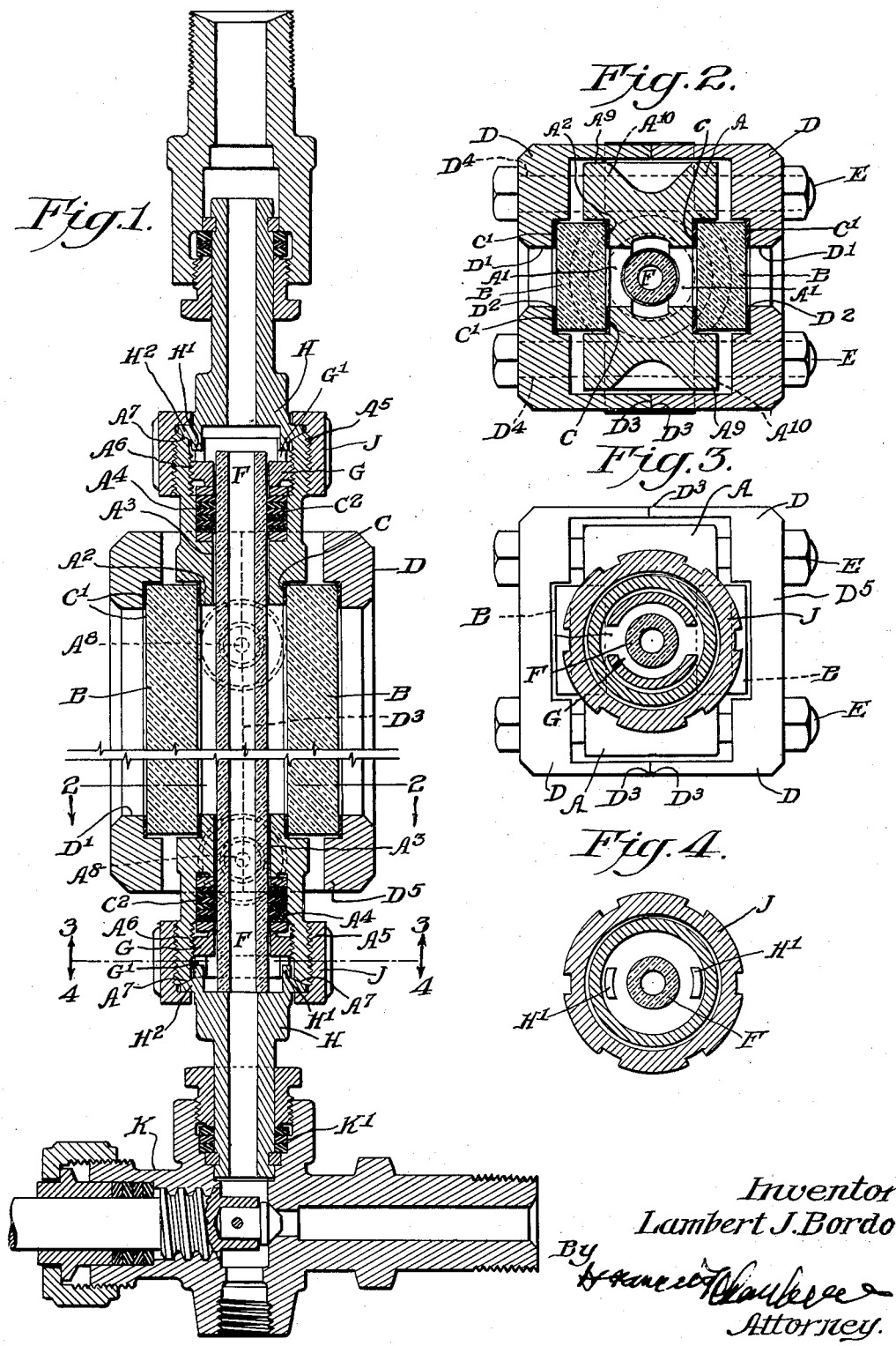
Inventor
Lambert J. Bordo
By
Attorney.

Patented June 13, 1939

2,161,849

UNITED STATES PATENT OFFICE 2,161,849

WATER LEVEL SIGHT GAUGE FOR BOILERS

Lambert J. Bordo, Willow Grove, Pa.

Application October 27, 1937, Serial No. 171,235

2 Claims. (Cl. 73—325)

My invention relates to water level sight gauges for boilers of the type in which a chamber casing adapted to be connected at its upper and lower ends with a boiler is formed with lateral openings closed by plates of glass clamped against the external edges of such openings and, preferentially, to gauges of this kind in which a glass tube extends through the length of the casing so as to serve normally as the connection between the upper and lower levels of the boiler to which the gauge is attached. As heretofore constructed, considerable trouble has been met with in clamping the glass plates to the chamber casing, both from breakage of the glass and in securing a joint between the glass plates and the edges of the openings in the chamber casing which they cover so as to form tight joints capable of preventing leakage when exposed to the high pressures existing in the chamber casing when no glass tube is used or, when used, such tube is broken and difficulty has also been met with in securing and maintaining a tight joint between the ends of the glass tube and the ends of the chamber casing into which the ends of the tube project and the object of my invention is, in the first place, to provide improved means for clamping the glass plates in position with a minimum tendency to fracture the plates and with a maximum avoidance of leakage between the edges of the glass plates and the edges of the openings to which they are secured and, also, to provide improved means for securing and, more particularly, for maintaining, leak-proof joints between the ends of the glass tube and the ends of the chamber casing through which it extends.

As heretofore constructed, glass plates have been clamped against the edges of the openings over which they extend by means of clamping plates having openings, the edges of which rest upon the outer edges of the glass plates which clamping plates are drawn against the glass plates by means of bolts acting on the outer portions of said clamping plates and I have found that this method of clamping the glass plates in position results in a bowing of the clamping plates which impairs the contacts of the clamping plates and the edges of the glass plates and brings irregular stresses upon the glass plates making them more liable to fracture and less effective in preventing leakage. It has also been proposed to form the clamping plates with lateral edges adapted to contact with nicely finished surface bearings on the lateral sides of the chamber casing and to draw the plates against such bearings and the lateral edges of the glass plates by bolts applying pressure to an intermediate portion of the clamping plate but this construction involves the provision of nicely finished bearing surfaces for the edges of the clamping plates on the lateral sides of the chamber casing as well as on the lateral edges of the plates, a matter of expensive and careful machining, and it is also, I believe, imperfectly effective in that the breadth of the clamping plate between its inner and outer lateral edges does not permit of as much springing or bowing of the plates under the pull of the bolts as I have found to be most effective in bringing about a maximum tightness of the joints with a minimum breakage of the glass plates and I have discovered that by broadening the clamping plates so that they will extend outward beyond the sides of the chamber casing and so forming their lateral outer edges that they will contact with each other or approximately so in a plane parallel to that of the glass plate when the clamping plates are in position to rest upon said plates and then drawing the plates toward each other by means, such as bolts, acting on the clamping plates between their contacting outer edges and the edges of the glass, that an entirely satisfactory, much cheaper, and, in actual use, a more effective joint can be formed between the glass plates and the edges upon which they rest and with a minimum tendency to bring about breakage of the glass plates, and the leading feature of my invention consists in the provision of a mechanical structure adapted to operate in the way above indicated.

In what I consider the preferential structure in which a glass tube extends through the chamber casing provided with the lateral sight glasses, it is important that during the normal operation of such a sight gauge, water and steam should be excluded from the space in the chamber casing surrounding the tube and, as heretofore constructed, the ends of the tube project into stuffing box chambers charged with compacted packing material which, to be thoroughly effective, required from time to time to be subjected to additional compressing strains and a further object of my invention is to provide a novel construction by means of which such additional compressing strains can from time to time be given to the packing with the least possible disassembling of the operative structure and with this object in view I have devised and successfully applied in use a device by means of which the packing can be, from time to time, put under additional compression without any real disassembling of the parts of the structure and with only a temporary loosening of some of the contacted parts. The character of this improvement will be best understood as described in connection with the drawing while its novel features will be clearly pointed out in the claims.

My invention will be best understood as described in connection with the drawing in which Figure 1 is a longitudinal central section through a water level sight gauge embodying my improvements, the section being also taken through one of the valve casings through which connection is made to the boiler.

Figure 2 is a cross-section on the line 2—2 of Fig. 1.

Figure 3 is a cross-section on the line 3—3 of Fig. 1, looking upward, and

Figure 4 is a cross-section on the line 4—4 of Fig. 1, looking downward.

A indicates the chamber casing having elongated lateral openings on opposite sides as indicated at $A^1A^1$, level seats $A^2A^2$ being provided on the outer edges of these openings. Openings $A^3A^3$ are provided at the upper and lower ends of the chamber casing to give passage to the ends of a glass tube. These openings connect with stuffing box chambers indicated at $A^4A^4$, the outer and inner portions of these stuffing box members being threaded as indicated at $A^5$ and $A^6$ and the ends $A^7$ of the stuffing box chambers are adapted to serve as seats for a joint forming member to be described. $A^8A^8$ indicate outlet openings leading from the top and bottom of the chamber casing which in use would be connected to valve controlled pipes not shown by which steam and water could be drawn off from the chamber. $A^9A^9$ indicate lateral ribs formed on the sides of the chamber casing which, as shown, are provided with bolt holes as indicated at $A^{10}$. B, B, indicate glass plates extending over the longitudinal openings in the chamber casing and seated on the seats $A^2$ with, as indicated, an intervening layer of packing material indicated at C and D, D, indicate clamping plates formed with openings $D^1D^1$, the edges $D^2D^2$ of which are adapted to rest on the edges of the glass plates with, as indicated, an intervening layer of packing indicated at $C^1$. As shown, the clamping plates D extend laterally beyond the body of the chamber casing A and the outer lateral edges of the clamping plates, as indicated at $D^3D^3$, are formed so as to contact with each other when assembled in position upon the glass plates so as to form abutments, the one for the other. The clamping plates are formed with bolt holes, as indicated at $D^4$, extending along a line lying between their outer edges and their inner edges in contact with the glass and clamping pressure is exerted on the clamping plates by means of bolts E, E, which, as shown, extend through the bolt holes $D^4$ in the clamping plates and through the bolt holes $A^{10}$ in the ribs $A^9$, the outer edges of the clamping plates being in contact with abutments, are not drawn down by the bolts, but the tendency of which is to create something of a downward bow to the clamping plates insuring that their edges in contact with the glass plates will exert pressure substantially over their entire contacting surface and it will be noticed that the metal at the ends of the clamping plates as indicated at $D^5$ is not reinforced by any ribs or lateral extensions which might tend to counteract any downward bowing of the plate.

F indicates a glass tube extending longitudinally through the chamber casing with its ends extending into the stuffing box chambers $A^4$. $C^2$, $C^2$, indicate packing located in the stuffing box chambers and surrounding the ends of the glass tube and G, G, indicate stuffing box glands screwing into the internally threaded ends of the stuffing boxes and adapted to exert compressive action upon the packing $C^2$. These ring glands are, as shown, formed with slots indicated at $G^1$ to enable the gland rings to be interengaged by the tube section H, an end portion of which is formed to enter the stuffing box and interengage with the gland ring as shown by means of ribs or fingers $H^1$. The tubes H are formed with annular flanges indicated at $H^2$ which are adapted to rest upon the edges $A^7$ of the stuffing box ends forming, preferably, a ground joint therewith and the two surfaces are normally drawn together to form a tight joint by means of a union nut J screwing upon the outer threaded ends of the stuffing box chambers $A^4$. The outer ends of the tubes H are as usual connected with valve casings, as indicated at K, the ends of the tubes entering the valve casing through stuffing boxes as indicated at $K^1$.

The operation of the clamping plates D in clamping down the glass plates B upon their seats $A^2$ surrounding the elongated openings A in the chamber casing has been sufficiently indicated in the foregoing description and, with regard to the effective packing of the ends of the glass tube F when the glass tube is in position with its ends extending into the stuffing box $A^4$, packing indicated at $C^2$ is inserted and compacted and then the gland ring G is screwed into the open ends of the stuffing box $A^4$ until it contacts with and further compresses the packing, the tubular member H is then inserted with its tongues $H^1$ engaged with the slots $G^1$ of the gland ring G and the annular flange $H^2$ contacting with the end of the stuffing box $A^7$. The union nut J is then screwed down on the threaded external portion of the stuffing box $A^4$, clamping the flange $A^2$ against the end of the stuffing box while, of course, the outer end of the tubular member H enters the valve K through its stuffing box $K^1$ and whenever in use a leak develops between the glass tube F and its packing $C^2$ it is only necessary to partially unscrew the union nut J whereupon the tubular member H can readily be rotated and, by reason of its engagement with the gland ring G, can screw said ring inward against the packing to compact it and cut off any leak after which the union nut is again tightened.

Having now described my invention, what I claim as new and desire to secure by Letters Patent, is:

1. In a water level sight gauge for boilers comprising a chamber casing adapted to be connected at its ends with a boiler and having lateral openings, glass plates extending over and seated on the edges of such openings, a glass tube extending through the openings at the end of the casing and through the intermediate portion thereof and clamping plates for securing the glass plates in position, improved means for securing and maintaining a tight joint around the ends of the glass tube and for effecting connections between said tube and the boiler, comprising stuffing box chambers formed at the ends of the chamber casing into which the ends of the glass tube project, said chambers being internally and externally screw threaded, gland rings adapted to screw into the internally threaded ends of the stuffing box chambers and compressed packing located therein, metallic tubes having ends adapted to extend into the stuffing box chambers and interengage with the gland rings and annular shoulders adapted to extend over and form a joint with the ends of the stuffing box chambers and union nuts extending over said annular shoulders and adapted to screw upon the externally threaded portions of the stuffing box chambers.

2. In a water level sight gauge for boilers comprising a chamber casing adapted to be connected at its ends with a boiler and having lateral openings formed on opposite sides of the casing and glass plates extending over and seated on the edges of such openings, the improvement which consists in providing as a means for securing and evenly clamping the glasses against their seats, clamping frames formed with openings the edges of which are adapted to rest upon the edges of the glass plates, and having lateral outer edges so formed that the side edges of the clamping frames located on opposite sides of the casing will contact with and serve as supports for each other when the clamping frames on opposite sides of the casing are in contact with the glass plates and means for drawing the frames together and clamping them against the glasses so located as to apply pressure to the frames at points intermediate their outer edges and their edges extending over the sides of the glass plates.

LAMBERT J. BORDO.